United States Patent [19]

Smith

[11] Patent Number: 4,928,174
[45] Date of Patent: May 22, 1990

[54] APPARATUS FOR REGISTERING A SCENE, ESPECIALLY FOR ITS REPRODUCTION ON THE SCREEN OF A VIDEO MONITOR

[75] Inventor: Terence M. Smith, Grebenstein, Fed. Rep. of Germany

[73] Assignee: Thyssen Industrie AG, Fed. Rep. of Germany

[21] Appl. No.: 253,249

[22] Filed: Oct. 4, 1988

[30] Foreign Application Priority Data

Oct. 5, 1987 [DE] Fed. Rep. of Germany ....... 3733593
Aug. 13, 1988 [EP] European Pat. Off. ......... 88113200.5

[51] Int. Cl.$^5$ .................. H04N 7/18; H04N 5/30
[52] U.S. Cl. ......................... 358/108; 358/229
[58] Field of Search ........... 358/229, 108, 180, 213.28, 358/185; 250/203 R

[56] References Cited

U.S. PATENT DOCUMENTS

| | | | |
|---|---|---|---|
| 4,734,778 | 3/1988 | Kobayashi | 358/229 |
| 4,740,839 | 4/1988 | Phillips | 358/108 |
| 4,803,557 | 2/1989 | Bridges | 358/229 |

FOREIGN PATENT DOCUMENTS 53-101939 9/1978 Japan .............................. 358/213.28

Primary Examiner—John K. Peng

[57] ABSTRACT

The invention relates to an apparatus for viewing a scene, especially for the reproduction thereon on the screen of a video monitor. This apparatus contains as usual a lens for projecting an image of the scene on a focal plane, and a video pickup lying in this focal plane for converting the brightness, and if necessary the hue, of individual points of the picture into electrical signals. To view a section of the scene or for recording, viewing and, in some cases, following a selected subject within the scene the video pickup is mounted in accordance with the invention for displacement in the focal plane over the entire image and is smaller than the image projected in the focal plane. The video pickup is furthermore coupled with a drive mechanism which contains drives acting in different directions. Another drive can serve to rotate the video pickup.

8 Claims, 10 Drawing Sheets

APPARATUS FOR REGISTERING A SCENE, ESPECIALLY FOR ITS REPRODUCTION ON THE SCREEN OF A VIDEO MONITOR

BACKGROUND OF THE INVENTION

The invention relates to an apparatus for registering a scene, especially for its reproduction on the screen of a video monitor. The apparatus has a housing, a lens mounted on the housing for projecting an image of the scene on a focal plane, a video pickup disposed in the housing, situated in the said focal plane and being of a bidimensional configuration for converting the brightness and, if desired, the hue of individual points of a portion of the image into electrical signals, the video pickup being displaceably mounted and smaller than the image. The apparatus also has a driving mechanism for shifting the video pickup in the focal plane.

Apparatus of this kind, described in German Federal Patent Nos. 32 23 971 and 36 06 765, are usually referred to and used as TV cameras, and are known in a great number of embodiments. Their photosensitive pickup elements usually consist of a CCD line sensor, i.e., a charge-coupled semiconductor component ("charge-coupled device"), which has a plurality of tiny CCD cells arranged in a row, whose charge can be controlled analogously by light, and has a length of several millimeters. The linear video pickup is associated with one line of the imaged scene and can be driven by a driving mechanism perpendicularly to the lines, in order to scan the entire scene. One advantage of such CCD components is that the picture information falling ing on them can be transferred in the form of electrical signals to a register and the image or video signal can be obtained by reading the register, without using a scanning electron beam. However, the need for the entire camera to remain stationary at least until the line sensor has once scanned the entire scene makes it unsuitable for a number of practical applications.

In addition to the line sensor, such TV cameras can also be equipped with additional CCD areal sensors as described in German Federal Offenlegungsschrift Nos. 36 06 765 and 36 16 400, which serve, for example, as finders for locating the scene to be recorded and in this case are rigidly mounted, or are present in addition to the actual video pickup to perform fine adjustments in addition to the actual video pickup and can for this purpose be moved about together with the latter.

Also, there are TV cameras in CCD technology whose video pickups consist of surface sensors and are mounted like the video pickups of conventional TV cameras (vidicons, iconoscopes, orthicons or the like) fixedly in the camera body. Such cameras are suitable also for recording motion.

The known apparatus have it in common that the lens, the video pickup and the apparatus connected therewith are disposed and mounted in the camera body such that always the entire scene coverable by the camera, corresponding to its "field of view," is scanned by the video pickup. If the scene to be recorded is larger than the field of view, or if the scene passes out of this field of view, the entire camera with all the parts contained in it must be subjected to a swinging and turning movement. The same is true when, for example, a moving object is to be followed with the camera. Both applications often entail considerable physical or constructional effort, because considerable masses have to be moved and enough space must be available to perform the swinging and turning movements. To avoid such movements it would be possible by selecting suitable lenses (wide-angle lenses, so-called "fish-eye" lenses) to assure that even very large scenes can be covered entirely by the camera or that moving objects will always be in the camera's field of view. This, however, would detract from the quality of reproduction, because still only the video pickups present in the individual case can serve to resolve the enlarged field of view.

On account of these circumstances, apparatus of the kind referred to above can be used to only a limited extent, especially for surveillance purposes of all kinds, but also for live pickups with rapidly changing scene locations, as is often the case at sporting events or the like. In the case of TV cameras mounted in buildings, as for example in banks or hotels, for the surveillance of large lobbies or waiting rooms, the field of view is either limited or an object located in it is visible but very unclearly, so that complex measures must be taken to mount the camera so as to be able to swing or rotate. In the case of swinging and rotating TV cameras disposed out of doors, for example at intersections and on roads for surveillance of traffic, the apparatus needed for the turning and rotation of the cameras are subject also to great wear by weather, dust, or the like, unless complex sealing systems are provided. In the case of cameras that have to be moved entirely or partly by hand, the great masses that have to be moved often create problems for the cameraman, especially when the cameras have to be moved rapidly. Lastly, it is hardly possible to mount such cameras on motor vehicles or aircraft and at the same time aim them in a wobble-free and stable manner at a selected object.

The invention sets for itself the task of improving the apparatus of the kind described above such that it will pick up and display scenes in greater detail and/or follow moving subjects within the scene, without moving as a whole, and especially without having to be swung or tilted.

SUMMARY OF THE INVENTION

This task is accomplished in accordance with the invention in that the video camera is mounted in the plane of focus for displacement over the entire image for recording, viewing and if necessary following a selected subject within the scene, and the driving mechanism contains drives acting in different directions.

The invention offers the advantage that, in following a subject that remains in the scene but otherwise can move however desired, the lens and the housing of the apparatus can be stationary and only the video pickup and any devices necessary for its operation need to be moved. Thus, the masses that have to be moved are greatly reduced. It is furthermore advantageous that, on the one hand, the apparent field of view of the apparatus, which corresponds to the useful aperture angle of the lens, is comparatively great, but on the other hand the actual field of vision, i.e., the section of the image observed at any moment of time by means of the video pickup and in some cases appearing on the entire image screen, is comparatively small, while in comparable known systems the lens coverage is always equal to the field of view. There is also the advantage that the image area that is displayed is presented with very good quality of reproduction and high resolving power, because the entire photosensitive surface of the camera and the entire picture screen are available for that purpose.

Additional advantageous features of the invention will be found in the subordinate claims.

BRIEF DESCRIPTION OF THE DRAWINGS

The invention will be further explained below through examples of its embodiment, in conjunction with the appended drawing wherein:

FIG. 1 shows an apparatus 1 in accordance with the invention, which is mounted on a mast 2 and serves for the observation or surveillance of a building 3. The apparatus 1 could alternatively, as indicated by the reference number 4, be mounted in the building and serve for the observation or surveillance of the space in front of the building.

In FIGS. 2 and 3 the apparatus 1 contains a full housing 5 which has an aperture on its front end into which a lens 6 is interchangeably placed. The lens 6 has as usual a diaphragm 7 and can additionally be provided with manually or automatically controlled devices 8 and 9 to control the diaphragm aperture and the focus. The lens 6, as is generally common in conventional TV cameras, forms a sharp image of a scene 10 in a diagrammatically indicated, preferably planar focal plane whose distance from the diaphragm 7 depends on the focal length of the lens 6. The scene 10 constitutes the apparent field of view of the apparatus 1, which is defined by a conical light beam with the acute angle $\beta$.

Figure 1:
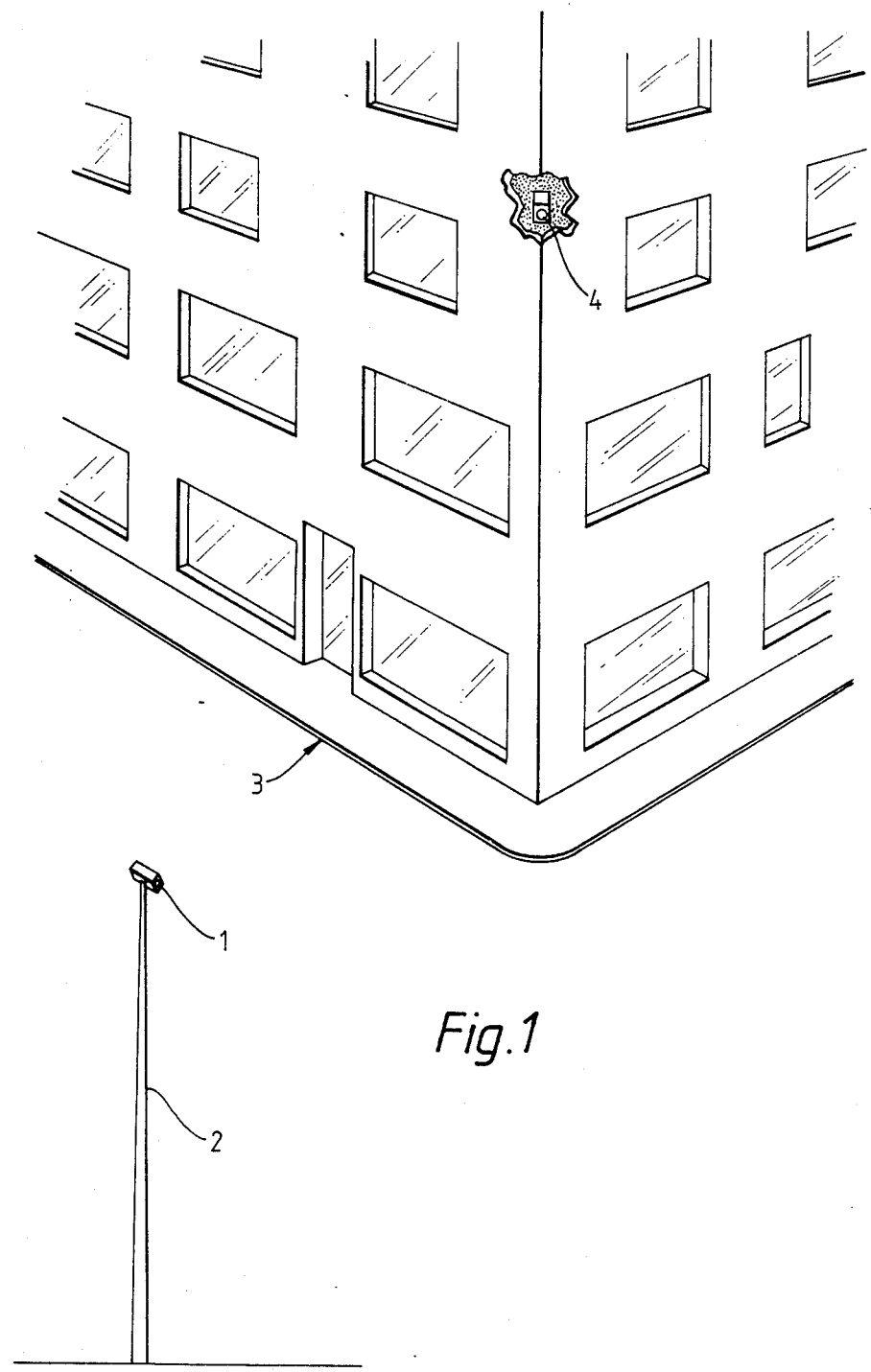
FIG. 1 is a diagrammatic representation of a form of application of the invention.

In the housing 5 a signal plate 12 is disposed behind the lens 6, and bears a photosensitive, planar video pickup 14. The signal plate 12 consists preferably of a charge-coupled device (CCD) on which a video pickup 14 is provided, which is formed of a plurality of photosensitive elements or cells arranged, for example, in rows, which are optoelectronic converters which when struck by light give an analog electrical signal corresponding to the brightness or hue of the light. All the photosensitive elements or cells form a planar or curved photosensitive surface corresponding to the image area. The signal plate 12 can furthermore be provided on its back with the necessary leads, amplifiers, storage devices or the like which form a circuit board and are often combined together with the signal plate 12 and the video pickup 14 to form a single integrated semiconductor component. The video pickup 14 or circuit board is connected by flexible cables 16 to an apparatus which contains the control circuits or the like which serve for scanning the video pickup 14, along with the electronics necessary for processing the electrical signals obtained from the scanning, and sends the common, standardized video signal (e.g., in accordance with the CCIR) to an output 18. The photosensitive surface of the signal plate 12 is smaller, preferably substantially smaller than the image surface 11.

Figure 2:
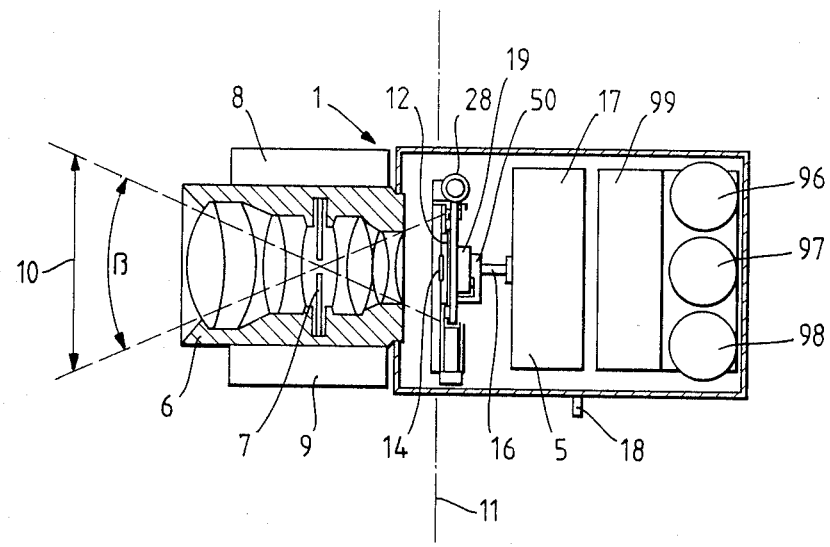
FIG. 2 is a diagrammatic longitudinal section taken as a plan view along the section line II—II of FIG. 4 through an apparatus in accordance with the invention.
Figure 3:
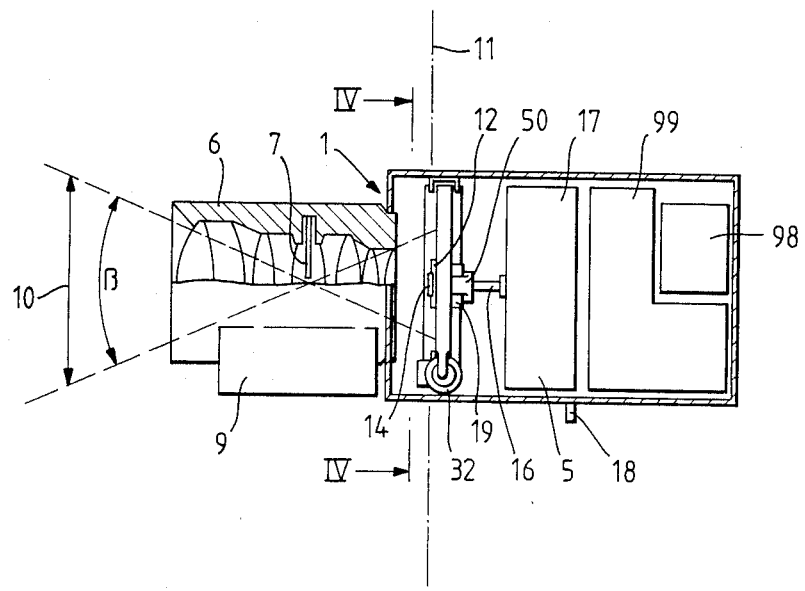
FIG. 3 is a diagrammatic longitudinal section taken as a side view along the section line III—III of FIG. 4.
Figure 4:
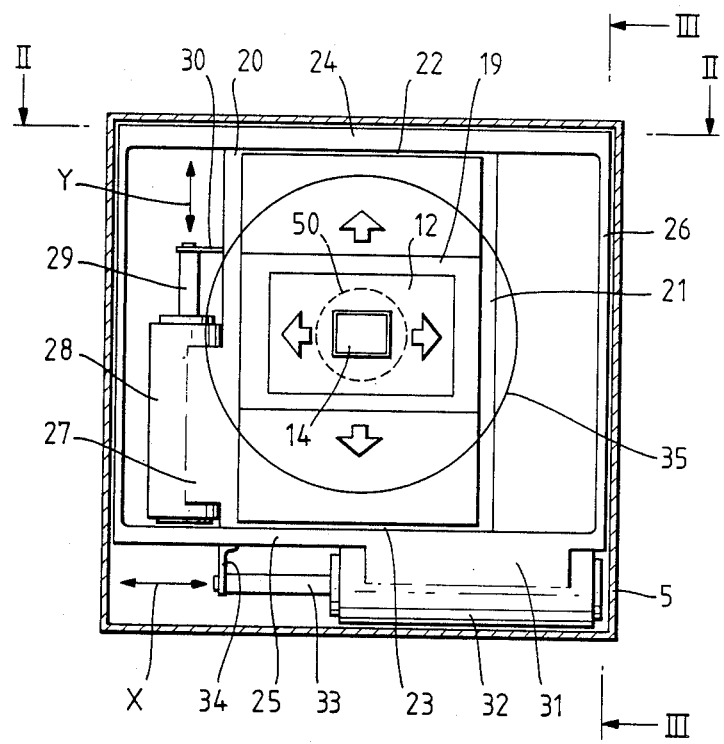

In FIG. 4 the signal plate 12 is fastened to a mounting 19 which consists preferably of a rectangular frame which is displaceably mounted at its each lateral end in a Y-axis guide 20 and 21. The Y-axis guides 20 and 21 are disposed parallel to one another and parallel to the image area 11 (FIGS. 2 and 3). The two Y-axis guides 20 and 21 are furthermore connected at their top and bottom ends by parallel cross members 22 and 23 and form with the latter an additional frame which is disposed displaceably in upper and lower X-axis guides 24 and 25 disposed parallel to one another and parallel to the focal plane 11, but perpendicular to the Y-axis guides 20 and 21. The X-axis guides 24 and 25 are joined by lateral members to form another frame 26 which is fixedly mounted in the case 5.

The guide 20 is provided with a side member 27 to which a driving mechanism is connected. This mechanism contains, for example, a linear drive 28 fastened to side member 27 and working in the direction of the Y axis, which acts on sliding rod 29 affixed by arm 30 to mounting 19. When sliding rod 29 is driven up and down by drive 28 parallel to arrow Y, mounting 19 will therefore by moved in direction Y. In like manner the frame 26 has a bottom member 31 which is connected with an additional driving mechanism. This mechanism contains, for example, a linear drive 32 fastened to bottom member 31 and acting in direction X, which has a sliding rod 33 which is affixed by an arm 34 to the Y-axis guide 20 or to the side member 27. When the sliding rod 33 is driven in and out by the drive 32 parallel to arrow X, the mounting 19 together with the components necessary for the Y movement is driven in direction X. Otherwise the movements of the mounting 19 in directions X and Y take place such that the entire surface of video pickup 14 always remains within the focal plane 11. This surface is indicated by a circle 35 (FIG. 4) as the area which results in the imaging of the entire scene indicated in FIGS. 2 and 3 by the angle $\beta$ and produced in sharp focus by the lens 6, and it is substantially larger than the photosensitive surface area of the video pickup 14.

The driving mechanisms for the video pickup 14 preferably contain drives 28 and 32 in the form of electrically controlled linear motors by which the sliding rods 29 and 33 can be moved back and forth linearly. Alternatively, however, any other drives can be used, e.g., reversible DC motors whose shafts, in the form of threaded spindles, are rotatably mounted in internally threaded nuts mounted in the arms 30 and 34. Also, the sliding rods 29 and 33 could be constructed as the piston rods of pneumatic or hydraulic jacks. It is also possible to provide driving mechanisms for operation by hand by simply providing the sliding rods 29 and 33 with ends extending out of the case 5 for manual manipulation.

Figure 5:
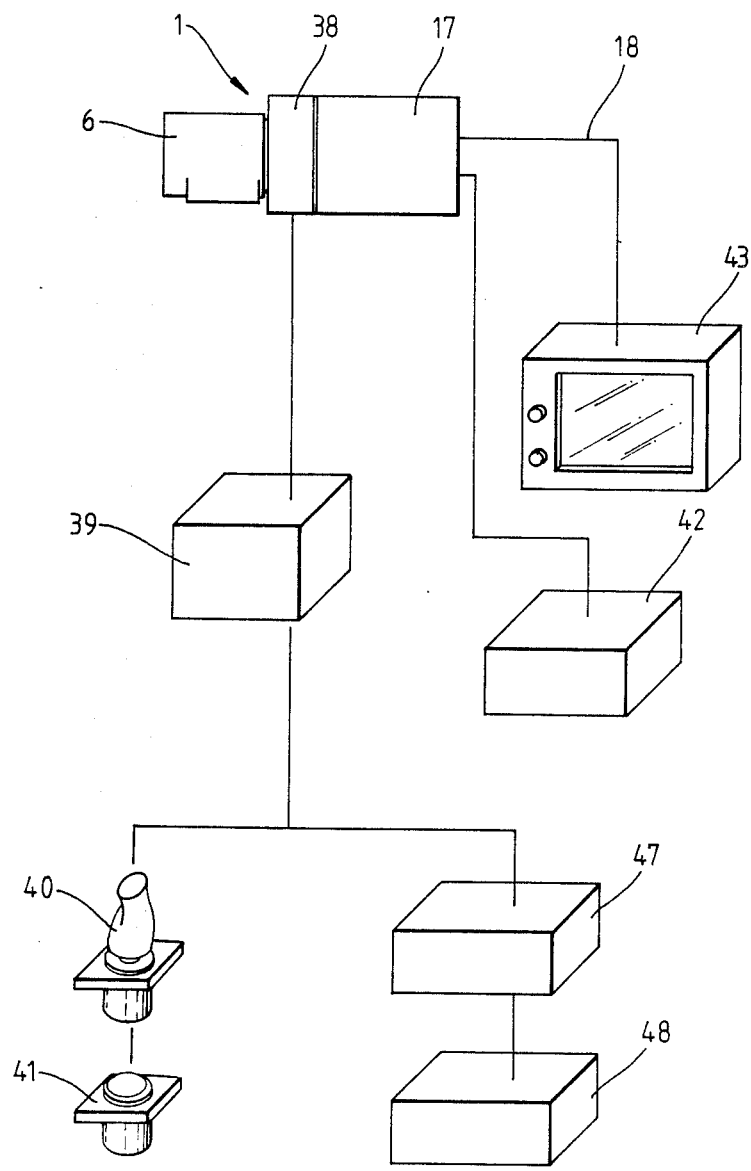
FIG. 5 is a block circuit diagram of the apparatus of FIGS. 2 to 4.

In FIG. 5 the parts to be manipulated by means of the driving mechanisms are represented schematically as a block 38 which is connected with a control circuit 39 such that the movements in directions X and Y can be actuated by means of manual controls in the form of joysticks or trackballs 40 or 41, respectively. Furthermore, FIG. 5 shows a power supply 42 connected to apparatus 1 and a video monitor 43 connected to the output 18 to which the video signal is delivered. Alternatively, a magnetic recording apparatus or the like could be connected to the output 18.

In FIG. 6 the lens 6 with its conical apparent field of view $\beta$ is indicated diagrammatically. The entire field of view is displayed on the focal plane 11 of the lens in which the video pickup 14 is movable, only movement in direction X being indicated in FIG. 6.

Figure 6A:
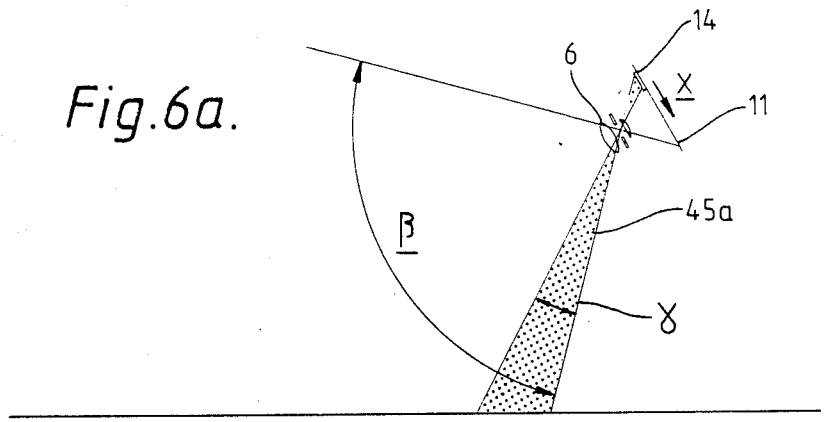
FIGS. 6a to 6c is a diagram of the sectional scanning of a field of view with the apparatus of FIGS. 2 to 5.
Figure 6B:
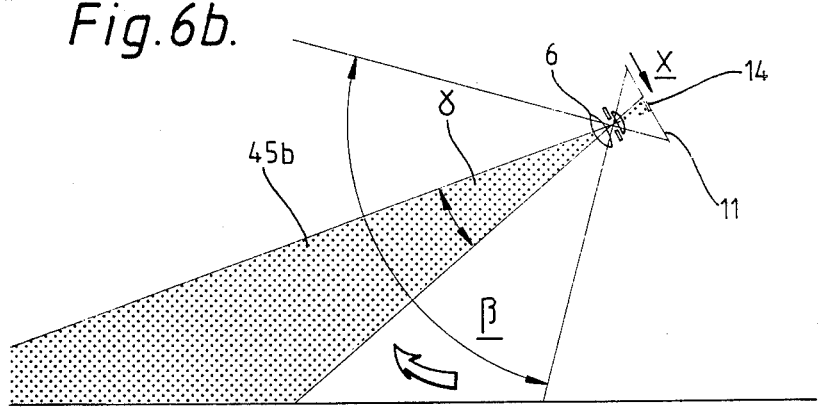
Figure 6C:
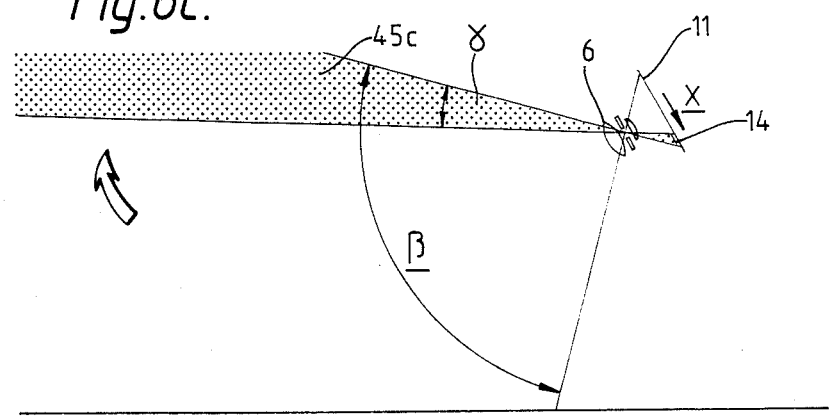

As FIG. 6 shows, the field of view of the lens 6 is projected on the plane of focus on an area that is much larger than surface area of the video pickup 14, and a video pickup 14 is used whose dimensions are substantially smaller than those of the image of the space projected by the lens on the focal plane 11. The result is that only that small section of the entire projected image is registered which is indicated in FIG. 6 by shaded cones 45a, 45b and 45c with the acute angles $\gamma$ and must be considered to be the actual field of view of the apparatus 1. Therefore if the video pickup 14 is shown in FIG. 6a in its one end position, it covers the cone 45a. If the video pickup 14 is gradually moved in the direction of the arrow X to the other end position seen in FIG. 6c, it covers cone 45c in this position, and on its way there it covers the cone between them, e.g., the cone 45b seen in FIG. 6b. This applies accordingly also to movements of the video pickup 14 in direction Y.

The photosensitive elements of the video pickup 14 are scanned horizontally and vertically by the conventional means of the television and video art and converted to a picture signal. This signal contains data which are analogous to the brightness and hue of those points of the image projected on the focal plane 11 which fall upon the photosensitive surface of the video pickup. Since this photosensitive area is reproduced by means of conventional television and video electronics as a full image on the screen of the monitor 43 (FIG. 5), the small section of the field of view of lens 6 which is defined in FIG. 6 by the cones 45a to 45c with the acute angles $\gamma$ is rendered visible and therefore corresponds to the actual field of view. On the other hand, the displayed section of the field of view $\beta$ can be selected as desired merely by the displacement of the video pickup 14 in the focal plane 11 without the need to move the lens 6, the case 5 or the system 17 in any way. The same applies to the case in which a subject moving through the covered scene is to be followed. The term "actual field of view" is to be understood, therefore, as the section appearing in each case on the monitor, and the term "apparent field of view" is to be understood as the scene projected on the focal plane 11 but not to be displayed on the monitor.

The advantages that can be achieved with the invention will appear especially in FIG. 1. For the clear, section-by-section viewing of a large scene, such as the building 3, it has formerly been necessary to dispose a television camera so as to be able to tilt, swing and turn on the mast 2 or at the point 4. In case of the mast 2, it has been necessary to provide swivel and tilt bearings at the top of the mast which can be controlled through the mast, while if the camera is mounted at point 4, a sufficiently large opening must be provided in the wall to accommodate the movements of the camera. If the apparatus in accordance with the invention is used, however, a comparatively small, shallow case containing only the lens 6 and the movable parts and the drive mechanism can be mounted fixedly on the mast 2 or at the point 4, so that this camera case need only be connected by electrical lines to the rest of the apparatus mounted on the ground or in the building 3, and no sealing problems or the like are involved.

Due to the reduction of the weight of the parts that have to be moved, considerable savings of energy can be achieved in the automatic control of the drive mechanisms, and this is especially advantageous when the apparatus 1 in accordance with the invention is used in or on moving objects such as motor vehicles or ships. By selecting suitable wide-angle lenses, apparent fields of view of $\beta = 180°$ and even more can be obtained, and even the use of so-called "fish-eye" lenses is possible, especially if no ideally distortion-free display is needed for a particular observation or surveillance application.

The fact that the video pickup can be moved in two different directions can be exploited not only for viewing and following a subject within the scene to be viewed but also simply for the purpose of steadying a subject on the monitor 43 (FIG. 5 in cases in which the entire described apparatus 1 itself is moved. This happens, for example, when the apparatus 1 is mounted on a motor vehicle, a boat, an airplane or any other aircraft. Every movement of the apparatus 1 due to instability of the body on which it is mounted would cause a different section of the scene captured by the camera to appear on the monitor 43. To avoid this disadvantage it is possible to move the video pickup 14 in both of the directions X and Y given for example, such that in spite of movements of the camera in these two directions the displayed or recorded subject will remain always the same. In other words, any deviation in directions X or Y from the aim of the camera will be compensated by a corresponding opposite movement of the video pickup 14 in directions X or Y.

The simplest form of such stabilization can be achieved by making use of the gyrostatic platforms usually present on ships, aircraft or the like, indicated schematically by a block 47 in FIG. 5. Such gyrostatic platforms are a component of conventional inertial navigation systems and supply electrical signals which correspond to the deviations of the ship, aircraft or the like, from an X axis and Y axis assumed to be fixed in space, i.e., a system of coordinates fixed in space. The signals thus obtained are then delivered to the drives 28 and 32. Instead of the output signals of gyrostatic platforms, the output signals of conventional background trackers can be used, which are indicated schematically by a block 48 in FIG. 5, and which are computer-controlled apparatus which use a selected fixed point as a reference point fixed in space for computing deviations in the position of the ships, aircraft or the like, in directions X and Y. Alternatively, it would then also be conceivable to combine both apparatus and use, for example, block 47 for rough stabilization and block 48 for fine stabilization.

The kind of stabilization described is a bidirectional stabilization which suffices for applications in which the apparatus 1 can be turned about the X axis and Y axis, but is fixedly disposed in regard to the Z axis and cannot be rotated about the latter. If rotations about the Z axis are possible the X and Y stabilization suffice to stabilize the subject on the screen. But there is no way of preventing this subject from tilting about the Z axis.

In a first embodiment the invention therefore provides to make the video pickup 14 not only movable parallel to the X and Y axes, but also to mount it for rotation about the Z axis. For this purpose the signal plate 12 is not rigidly affixed to the mounting 19, but is mounted for rotation thereon by means of an additional driving mechanism. This additional driving mechanism contains, for example, a drive 50 which is fastened on the back of the mounting 19 and can be connected to the apparatus 17 by a flexible cable, not shown, similar to cables 16. Thus it is possible to displace the mounting 19 and with it the drive 50 in directions X and Y, and at the same time to rotate the video pickup 14 about the Z axis. A rotation of the entire apparatus 1 about the Z axis on the basis of a corresponding rotatory movement of the body on which it is mounted can therefore be compensated by a corresponding counterrotation of the video pickup 14, so that the result is an image section that is stabilized in every respect. The signals for actuating the drive 50 can, like those of drives 28 and 32, be taken from the outputs of blocks 47 and/or 48.

Figure 7:
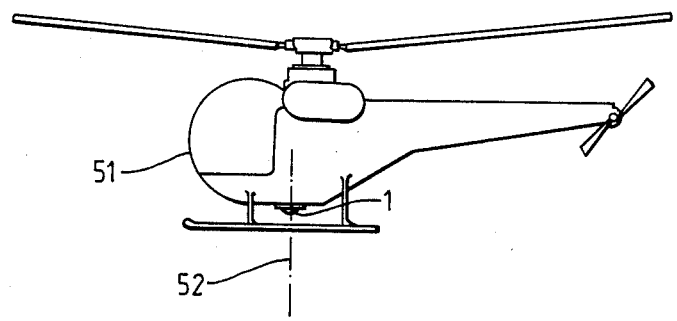
FIG. 7 shows diagrammatically a possibility for the application of the apparatus of FIGS. 2-4.

Sometimes it is desired to shoot a still picture from a hovering aircraft, i.e., one which can turn any desired multiple of 360° about the Z axis. Such is the case, for example, when the apparatus 1 is mounted as shown in FIG. 7 on a diagrammatically indicated helicopter 51 and the Z axis is assumed to be the vertical (=line 52). If the helicopter is to be able to turn on the Z axis as often as desired in the same sense of rotation, the video pickup must be rotatable as many times about the Z axis. In order in this case to prevent the flexible cables 16 (FIGS. 2 and 3) from twisting and tangling, the signal plate 12 can, as provided in FIG. 8, be mounted on a preferably miniaturized slip-ring system 53.

For this purpose the mounting 19 is in the form of a bushing and provided with a flange 54 to which the drive 50, preferably a rotary motor, is fastened, which has a drive shaft 55 which can rotate parallel to the Z axis or on the Z axis. The mounting 19 is coaxially surrounded by a cylinder 56 which is provided on the end remote from the drive 50 with an end wall 57 fastened to the drive shaft 55. This end wall 57 serves as a carrier for a planar circuit board 58 which is mounted on the back of the signal plate 12, and in which the electrical wires etc. connected to the cables 16 are contained.

Figure 8:
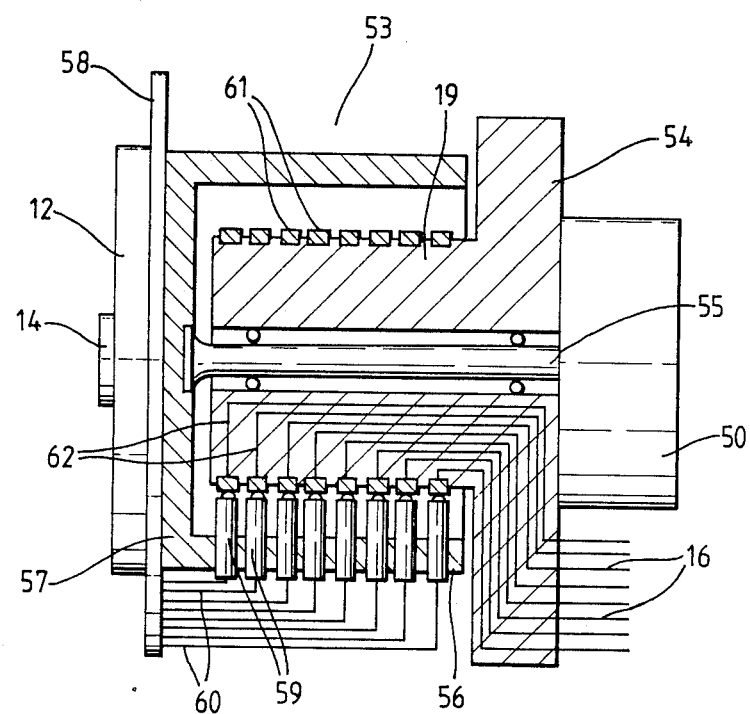
FIG. 8 is a longitudinal section through a slip ring system of the apparatus of FIGS. 2-4.

The cylinder 56 has on its inner periphery a plurality of brushes 59 which are indicated only diagrammatically in FIG. 8. The brushes 59 are connected each to one of the conductors 60 coming from the circuit board 58 and, if necessary, passed through the end wall 57, and they are connected each to a slip ring 61, all slip rings 61 being mounted on the outer periphery of the mounting 19 and spaced apart from one another axially. The slip rings 61 are in turn carried out each through the mounting 19 and its flange 54 and combined to form the cables 16 seen in FIGS. 2 and 3. The brushes 59 and slip rings 61 consist otherwise of a good electrically conductive material, and the slip rings 61 coaxially surround the drive shaft 55. Thus, when the drive shaft 55 rotates, each conductor 60 will always be connected through an associated pair of terminals consisting of a brush 59 and a slip ring 61 to an associated conductor 62, the conductors 60 rotating together with the end wall and the signal plate 12, while the conductors 62 and thus also the cables 16 are prevented from rotating and can move in the X and Y directions only together with the mounting 19. The slip ring system 53 therefore makes it possible to rotate the drive shaft 55 as often as desired in the same direction by 360° each time, without causing the cables 16 to twist or tangle together.

The apparatus in accordance with the invention is not limited to the feature that the signal plate 12 is movable parallel to the coordinates of a right-angled system of X and Y coordinates. It would also be possible, for example, to let the X and Y movements take place at angles other than 90°. It is furthermore possible to move the signal plates on the one hand on an arc, and on the other hand to vary the radius of the arc, i.e., to control the movement along polar coordinates instead of cartesian coordinates. In an embodiment such as this an additional rotation of the signal plates about the Z axis can be provided, i.e., about an axis which is perpendicular to the surface within which the signal plates are movable in two directions.

Figure 9:
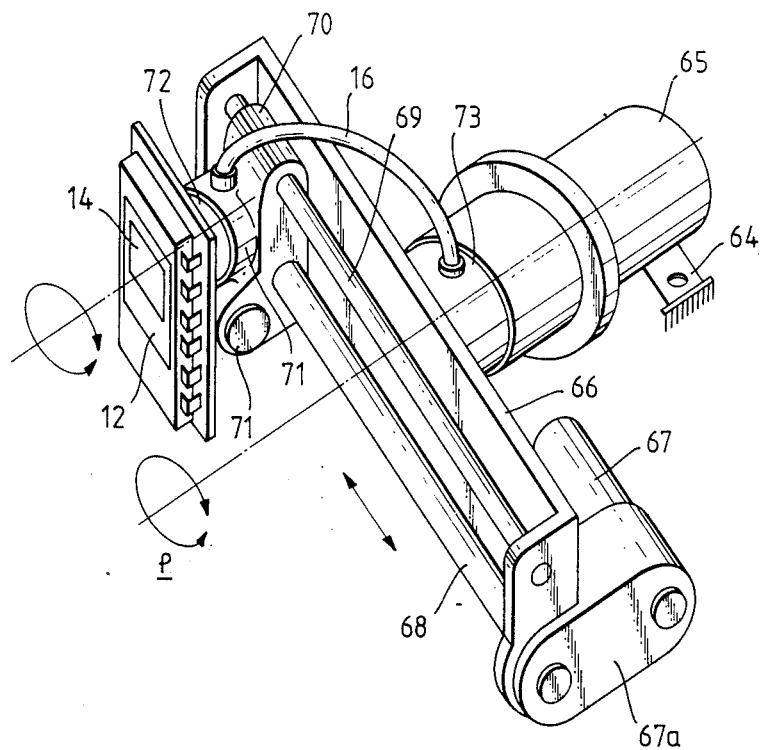
FIG. 9 is a perspective diagrammatic representation of a second embodiment of a driving mechanism for the apparatus of FIGS. 2-4.

Such a second embodiment of the invention is represented diagrammatically in FIG. 9 wherein it is assumed that the entire apparatus 1, of which only those parts necessary for the movement of the video pickup 14 are represented, is mounted on a body 64 which can be, for example, an aircraft fuselage or the like. A first drive mechanism with a drive 65 in the form of a rotary motor is fixedly mounted on the body 64 and a mounting block 66 is fastened to its drive shaft. On the mounting block 66 there is fixedly mounted a second drive mechanism having a drive 67. This drive 67 consists, for example, of a rotary motor which is fastened to the mounting block 66 and has a drive shaft which is connected by a right-angle drive 67a to a threaded spindle 68 mounted for rotation in the mounting block 66. The axis of the drive shaft of the drive 65 is preferably perpendicular to the axis of the threaded spindle 68.

At least one guide rail 69 parallel to the threaded spindle is fastened on the mounting block 66 and extends through a guiding bore in a second mounting block 70 which also has a threaded bore into which the threaded spindle 68 is screwed. On the front side of the mounting block 70 there is fastened a third drive mechanism with a drive 71 which preferably likewise consists of a rotary motor which has a drive shaft preferably connected by right-angle drive 71a to the signal plate 12 also disposed on the front side of the mounting block 70 or to a plate bearing the signal plate 12. At the same time the axes of the two drives 65 and 71 are preferably disposed parallel to one another.

The drives 65 and 67 permit a displacement of the signal plate 12 in a flat polar coordinate system, since a rotation of the threaded spindle 68 produces a movement in the direction of the radius running from the axis of the drive 65, while a rotation of the drive 65 is coupled with a rotation of the mounting block 66 and therefore also of the signal plate 12 by the angle l. Tilting of the subject transmitted by the video pickup due to such rotation can be compensated by turning on the drive 71 and thereby rotating the signal plate 12 by an amount corresponding to the angle of rotation l, but in the opposite direction. This makes it possible on the one hand to follow, with a fixedly disposed apparatus 1, a subject selected in the viewed scene or moving therein, also with the use of polar coordinates, without having the subject turning in the displayed or transmitted image. On the other hand, in an application corresponding to FIG. 7 the drive 71 can be utilized for the stabilization of the image of the subject in the case of rotations about the vertical axis. The blocks 47 and 48 represented in FIG. 5 can be used in exercising the controls, but a conversion of the control signals to polar coordinates would also be necessary.

Otherwise, the controls described in connection with FIGS. 2 to 4 and 9 can all be performed purely mechanically and manually. Furthermore, in the embodiment shown in FIG. 9, to prevent twisting of the cable 16 to be connected to the signal plate 12 or to the planar circuit board, as in the case of FIG. 8, the drive 71 can be connected to the signal plate 12 through a slip-ring connection, for example by providing the flange 54 with prolongations which are fastened to the mounting block 70. Furthermore the cable 16 can be carried through an additional, similar slip-ring arrangement 73 by which the drive 65 is joined to the mounting block 66 so that the mounting block 66 can also be rotated as desired.

Figure 10:
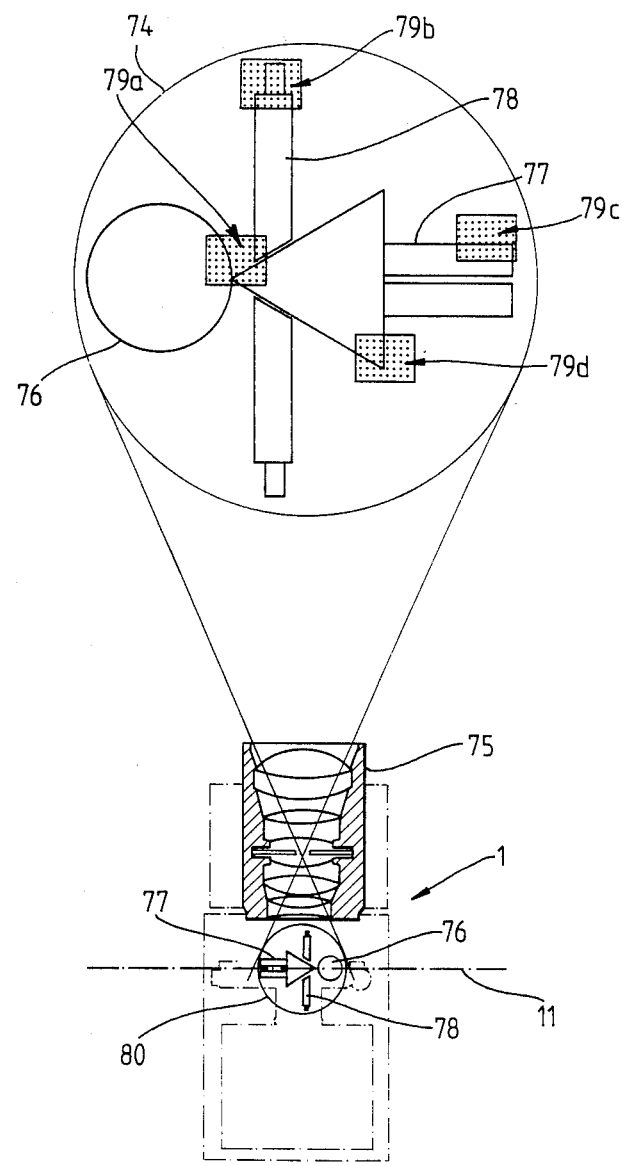
FIGS. 10 and 11 show schematically details of a subject in the field of view of the apparatus of FIGS. 2 to 5 on the viewscreen of a video apparatus.
Figure 11:
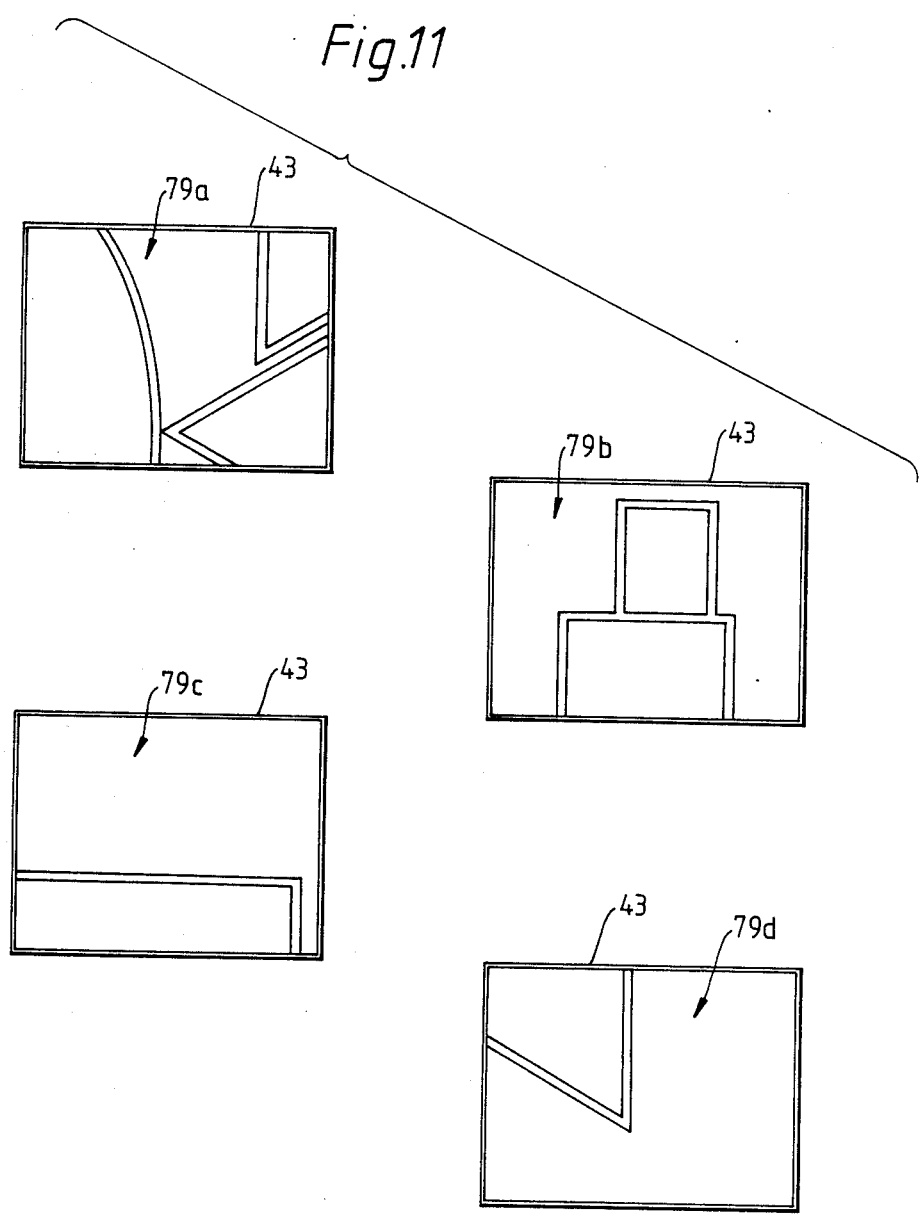

FIGS. 10 and 11 show diagrammatically the manner of operation of the apparatus 1 in accordance with the invention as represented in FIGS. 2 to 4. In FIG. 11 the field of view 74 of a lens 75, i.e., the scene that can be covered by this lens, is indicated by a circle rotated 90° in the plane of drawing, and in it a subject identified by a circle 76, an arrow 77 and a bar 78 is arranged as it is seen by an observer at the location of the apparatus 1. Four characteristic details 79a to 79d of the subject, for example, framed each by a rectangle, are to be displayed on a monitor. The lens 75 projects this subject on the plane of focus 11 in a mirror-image reversal as indicated in FIG. 11 by a circle 80 rotated 90° in the plane of the drawing. The parts 76, 77 and 78 of the subject are represented as they are seen from the direction of the video pickup 14 disposed behind the focal plane 11 or by an observer looking from the side of the apparatus 17, i.e., from the rear, at a ground glass disposed in the focal plane 11, for example.

To prevent the image that appears on the viewscreen of the monitor 43 (FIG. 5) from being displayed in mirror-image reversal, a negative-to-positive conversion must be performed. This is performed by the conventional means of the television art somewhere within the apparatus 17 or at any other point in the signal path between the video pickup 14 and the screen of the monitor 43. Therefore the details 79a to 79d (FIG. 10) are displayed positively on the monitor 43 as enlarged details 79a to 79d (FIG. 11) if it is assumed that the size of the video pickup 14 is just as large as the rectangular frames around the details 79a to 79d in FIG. 10.

In one practical embodiment in accordance with FIGS. 2 to 4, a CCD chip with a video pickup which has a width of 4.5 mm, a height of 6 mm and a diagonal of 7.5 mm, and is provided on this surface with 604 horizontal and 575 vertical photosensitive elements (pixels). The lens has a focal length of 24 mm, an aperture of 2.8, and is designed for a camera with a format of 24 mm×36 mm with a diagonal of about 43.3 mm. Assuming that subjects which are at a comparatively great distance from the lens will be projected into its focal plane, this means that the field of view that can be covered by the lens and can be projected within the format of 24 mm×36 mm corresponds to a cone with an apex angle of approximately 84.1°. Since the video pickup has a diagonal of 7.5 mm, only those sections of the field of view can be covered by the video pickup which are within a cone with an apex angle of about 17.8°. To cover the entire field of view corresponding to the 24 mm×36 mm format, the center point formed by the diagonals of the video pickup must be movable within a circular surface having a radius that is about 3.75 mm smaller than half of the diagonal of the 24 mm×36 mm format and amounts to about 17.9 mm.

The invention is advantageously embodied by conventional CCD technology, although it could also be carried out by ordinary technology. Suitable CCD chips are for example those which are used in the CCD High Resolution Colour Camera HR 600 C of the firm, aqua Gesellschaft fuer Industriekameras und Mikroelektronik GmbH of 8960 Kempten, Federal Republic of Germany, or in the CCD Subminiature Robot Eye SM 72 of the same firm. Both devices are adapted to the CCIR TV standard of 625 lines, 50 frames per second, with 2:1 interlace. In the SM 72 Robot Eye, a sensor head measuring 30 mm W,×40 mm H×30 mm D and containing the signal plate is provided, which is connected by a flexible cable to an electronic section which can be connected by an additional cable to a monitor and to the 12-volt power supply. Alternately, the CCD signal plates of other firms can be used, e.g., the model TH 7861 of Thomson-CSF, Division Tubes Electroniques, of Boulogne-Billancourt Cedex, France, or the RGS video pickup of Valvo GmbH U.B. Bauelemente, of Philips GmbH, of Hamburg, Fed. Rep. of Germany.

Figure 12:
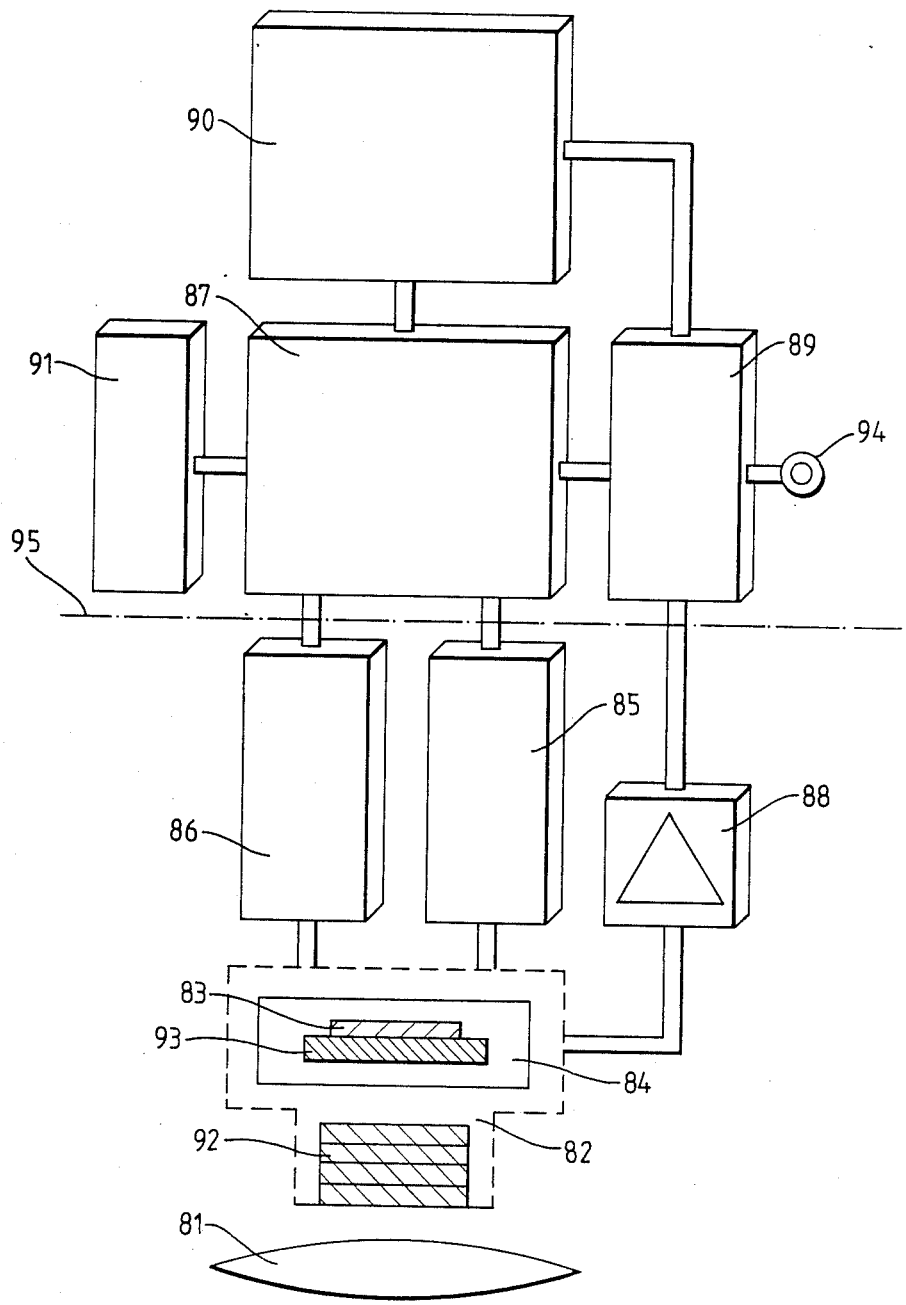
FIG. 12 is the block circuit diagram of a circuit which can be connected to the apparatus in accordance with the invention.

FIG. 12 shows a conventional block circuit diagram for a CCD component. A signal plate 82 with a CCD video pickup 83 is disposed behind a lens 81. If necessary the video pickup is combined by integrated technology into a CCD image converter block with a matrix-like storage plate and the registers needed for reading it out. A horizontal driver 85 and a vertical driver 86 are connected to the signal plate 82; these drivers are under the control of a clock 87 which produces the horizontal and vertical scanning pulses needed for the horizontal and vertical readout of the video pickup 83 or of the storage plate. The read signals are fed through an amplifier block 88 to a processing block 89 which is controlled by the clock 87 and to which the necessary synchronizing signals are fed from a synchronization block 90 controlled by the clock 87. The control program is stored, for example, in a program memory 91 in the form of a ROM.

On the front the signal plate 82 has an optical filter 92 which contains, for example, a filter to protect the video pickup 83 against short-wavelength radiation. A color screen filter 93 can also be disposed directly on the front of the video pickup 83 which associates a red, green or blue filter element with each element or each line (pixel) of the video pickup 83 when color pictures are to be transmitted. The signals obtained from the video pickup 83 are processed in the processing block 89 to the correct TV form according to the particular monitor and sent as a video signal to an output 94 connected to the monitor. Lastly, the broken line 95 indicates a preferred line of separation between the moving components and the fixed components in a camera case, parts 82, 85, 86 and 88 forming the movable block and parts 81, 87, 89, 90 and 91 the fixed block.

The invention is not limited to the embodiments described, which can be modified in many ways. Instead of blocks 47 and 48 described in connection with FIG. 5, gyros 96, 97 and 98 built directly into the housing of apparatus 1 can be used, as indicated in FIGS. 2 and 3, and can be connected to a stabilizing and control circuit 99. Thus, all signals indicating the deviations from a desired position and necessary for the stabilization are obtained in the apparatus itself, converted to actuating signals for the movement of drives 28, 32 and 50, and used for the corresponding stabilization of the section of the image in question. Gyro 96 can be an X-axis gyro, gyro 97 a Y-axis gyro and gyro 98 a gyro detecting the rotary movements about the Z axis.

Also, it is possible to provide the apparatus in accordance with the invention with different lenses, as is the common practice in the photography and television arts, and to display the subject in black and white or in color on the monitor screen. Furthermore, the invention is not limited to the use of visible light, but can also be used in suitable modifications for the viewing of objects by the infrared, x-ray or ultraviolet art. Finally, the slip-ring systems can be avoided by additionally mounting a microwave transmitter on the signal plate 12 or the circuit board connected thereto. This transmitter could send to the circuit 17 all signals that formerly were sent through the cable 16. The circuit 17 would in this case be provided with a corresponding receiver to forward the received signals to the output 18, for example, or to an amplifier connected thereto. This would result in the advantage that the cable 16 would have to carry only the operating voltage for the signal plate or its circuit board, which can easily be done without using a complex slip-ring arrangement.

I claim:

1. Apparatus for viewing a scene, especially for its reproduction on a view-screen of a video monitor, comprising: a housing, a lens mounted on the housing for projecting an image of the scene on a focal plane, a video pickup disposed in the housing, situated in the focal plane and being of a bidimensional configuration for converting the brightness and, if desired, the hue of individual points of a portion of the image into electrical signals, the video pickup being smaller than the image and being mounted for rotation around an axis and for displacement over the entire image for viewing, studying and in some cases following of a selected subject within the scene, and a driving mechanism for shifting the video pickup in the focal plane, said driving mechanism containing drives acting in different directions and an additional drive for rotating the video pickup around said axis.

2. Apparatus in accordance with claim 1, wherein the video pickup consists of photosensitive elements or cells of a CCD component.

3. Apparatus in accordance with claim 1, wherein the video pickup is fastened in a mounting and the mounting is connected with a sliding rod of a linear drive.

4. Apparatus in accordance with claim 3, wherein the mounting is mounted for displacement in guides of a frame bearing the drive and coupled with the additional drive.

5. Apparatus in accordance with claim 1, wherein the focal plane is a plane.

6. Apparatus in accordance with claim 1, wherein a slipring system is associated with the drive mechanism for the additional drive.

7. Apparatus in accordance with claim 1, wherein for the purpose of steadying a subject on the video monitor at least one of said drives is controlled by signals derived from signals characteristic for deviations of a desired position of a body on which the apparatus is mounted with respect to a system of coordinates fixed in space.

8. Apparatus in accordance with claim 7, wherein means supplying said signals characteristic for said deviations are built into the housing.

* * * * *